United States Patent
Wu et al.

(10) Patent No.: US 12,255,532 B2
(45) Date of Patent: Mar. 18, 2025

(54) MODULAR AC/DC POWER CONVERSION MODULE FOR POWER SOURCES AND LOADS AND METHOD OF DRIVING THE SAME

(71) Applicant: CHROMA ATE INC., Taoyuan (TW)

(72) Inventors: Chen Yuan Wu, Taoyuan (TW); Chih Hsien Wang, Taoyuan (TW); Kuo Cheng Wang, Taoyuan (TW); Cheng Chung Lee, Taoyuan (TW)

(73) Assignee: CHROMA ATE INC., Taoyuan (TW)

( * ) Notice: Subject to any disclaimer, the term of this patent is extended or adjusted under 35 U.S.C. 154(b) by 236 days.

(21) Appl. No.: 18/050,060

(22) Filed: Oct. 27, 2022

(65) Prior Publication Data
US 2023/0155497 A1 May 18, 2023

(30) Foreign Application Priority Data
Nov. 16, 2021 (TW) .................. 110142512

(51) Int. Cl.
*H02M 3/157* (2006.01)
*H02M 1/00* (2006.01)
(Continued)

(52) U.S. Cl.
CPC ......... *H02M 3/139* (2013.01); *H02M 1/0025* (2021.05); *H02M 3/157* (2013.01); *H02M 3/1582* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30;
(Continued)

(56) References Cited

U.S. PATENT DOCUMENTS

6,795,322 B2 * 9/2004 Aihara .................... H02J 9/061
307/64
9,513,324 B1 * 12/2016 Treichler ............... G01R 31/50
(Continued)

*Primary Examiner* — Sean Kayes
*Assistant Examiner* — Nusrat Quddus
(74) *Attorney, Agent, or Firm* — McClure, Qualey & Rodack, LLP (57) ABSTRACT

A modular AC/DC power conversion module for power sources and loads and a method of driving the same is provided. When an AC/DC converter is electrically coupled to an external power source, a microprocessor is electrically energized by a buck auxiliary circuit, under control of the microprocessor, a DC/DC converter is activated for a certain time period, and then, the AC/DC converter is activated. Thereafter, an output voltage of the AC/DC converter is boosted, and an output voltage of the DC/DC converter is boosted accordingly. Power elements in the downstream side DC/DC converter are activated first, and then power elements in the upstream side AC/DC converter are activated, thereby an inrush current is suppressed. Once the external power source is connected, the buck auxiliary circuit will automatically reduce a voltage of the power input to activate the module. It realizes that the module will autonomously operate after being electrically energized.

8 Claims, 4 Drawing Sheets

(51) Int. Cl.
*H02M 3/139* (2006.01)
*H02M 3/158* (2006.01)

(58) Field of Classification Search
CPC ... G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 3/073; H02M 3/137; H02M 3/28; H02M 3/315; H02M 3/3155; H02M 3/325; H02M 3/335; H02M 7/515; H02M 7/521; H02M 7/53; H02M 7/537; H02M 7/5383; H02M 7/53862; H02M 7/757; H02M 7/79; H02M 3/337; H02M 3/338; H02M 3/3382; H02M 3/3384; H02M 7/538; H02M 7/53832; H02M 7/53835; H02M 7/487; H02M 7/539; H02M 7/23; H02M 7/21; H02M 7/04; H02M 7/00; H05B 39/048; B23K 11/24; H04B 2215/069; H02J 3/46; H02J 3/38
See application file for complete search history.

(56) References Cited

U.S. PATENT DOCUMENTS

| | | | | |
|---|---|---|---|---|
| 9,642,242 | B2* | 5/2017 | Ido | H05K 7/1432 |
| 10,195,949 | B2* | 2/2019 | Takei | H02J 7/0029 |
| 2004/0085793 | A1* | 5/2004 | Afzal | H02J 9/061 |
| | | | | 363/142 |
| 2017/0358956 | A1* | 12/2017 | Martin | H03K 7/08 |
| 2018/0054140 | A1* | 2/2018 | Chen | H02J 3/381 |
| 2018/0152115 | A1* | 5/2018 | Yan | H02M 3/158 |
| 2019/0329663 | A1* | 10/2019 | Kominami | H02J 7/0013 |

* cited by examiner

MODULAR AC/DC POWER CONVERSION MODULE FOR POWER SOURCES AND LOADS AND METHOD OF DRIVING THE SAME

BACKGROUND OF THE INVENTION

Field of the Invention

The instant disclosure relates to modular AC/DC power conversion module for power sources and loads and a method of driving the same, in particular to a modularized power conversion module with current rectification and voltage transformation functions and a method of driving the same, which are especially suitable for a power supply or an electronic load.

Description of the Related Art

With the continuous development of technology, an instrument such as a power supply or an electronic load has various powerful functions. However, the progress of the AC/DC power converter circuit included therein is quite limited, and the design and arrangement of the AC/DC power converter circuit remain unchanged. That is, the AC/DC power converter circuit of each instrument of each manufacturer is designed individually according to the characteristics and special requirements thereof and integrated into the main circuit board. In other words, it is not allowed to be separated from the main circuit board and shared among various instruments.

Furthermore, dual power inputs are required for an existing power source or load instrument, including the primary power input for the predetermined power output and the auxiliary power input to assist the operation of the instrument. Specifically, in the case of a power supply, in addition to a primary power source connected to the power supply, the entire activation operation requires an auxiliary circuit driven by another power input, i.e. the auxiliary power input, for detecting the primary power input and driving a processor.

Moreover, the AC/DC power converter circuit in the existing power source or load equipment does not have an early abnormality reporting and protection mechanism. Once an abnormality occurs, the AC/DC power converter circuit is incapable of stopping operating immediately and of reporting the abnormality. Detection of the abnormality relies on the power output conversion module at the downstream side, and then the main controller takes measures against the abnormality if the abnormality is detected. However, this existing abnormality reporting and protection mechanism is incapable of immediately deactivating the output module at an early stage, so it often causes serious damage to the equipment.

As can be seen from the above, an AC/DC power converter module, in which the AC/DC power converter circuit is modularized and which does not require an auxiliary circuit driven by an another power input and has an early abnormality reporting and protection mechanism, and a method of driving the same are indeed highly expected in the industry and the public.

SUMMARY OF THE INVENTION

One of the main objects of the instant disclosure is to realize the modularization of AC/DC power converter circuit, which can be used as a power converter connected in parallel with the mains, and at the downstream side of which an output power conversion module having a DC current input, such as a power supply module or an electronic load module, can be arbitrarily arranged so that various types of bidirectional power supply apparatuses can share the achievements of modularization. Accordingly, the modular design of the instant disclosure is beneficial to the maintenance of the apparatus upon failure, and is also convenient for the development and design of various power source/load instrument products.

Another main object of the instant disclosure is to realize automatic activation and automatic operation after electricity is supplied, without the need to assist in activation operation through an additional auxiliary circuit driven by another external power input. Specifically, when an external power source is connected, the module itself automatically initiates the activation procedure and establish an input voltage required by the output power converter. Once the input voltage is established, the output power converter will be automatically activated, thereby realizing a consistent processing flow of single power input, and automatically processing output.

In order to achieve the aforementioned objects, a modular AC/DC power conversion module for power sources and loads of the instant disclosure mainly comprises an AC/DC converter, a DC/DC converter, a buck auxiliary circuit and a microprocessor. The AC/DC converter includes a first power element, which is electrically coupled to an external power source; the DC/DC converter includes a second power element and a third power element which are electrically coupled to each other, the second power element is electrically coupled to the AC/DC converter, and the third power element is electrically coupled to an output power conversion module; the buck auxiliary circuit is electrically coupled between the AC/DC converter and the DC/DC converter; the microprocessor is electrically coupled to the AC/DC converter, the DC/DC converter and the buck auxiliary circuit. When the AC/DC converter is electrically coupled to the external power source, the microprocessor is electrically powered by the buck auxiliary circuit; under the control of the microprocessor, the second power element and the third power element are activated for a certain time period, and then, the first power element is activated; an output voltage of the AC/DC converter is boosted, and an output voltage of the DC/DC converter is boosted accordingly.

In order to achieve the aforementioned objects, a method of driving a modular AC/DC power conversion module for power sources and loads is provided, wherein the modular AC/DC power conversion module for power sources and loads mainly includes an AC/DC converter, a DC/DC converter, a buck auxiliary circuit and a microprocessor; the buck auxiliary circuit is electrically coupled between the AC/DC converter and the DC/DC converter, the method comprising the steps of: providing an external power source to the AC/DC converter and the buck auxiliary circuit; modulating a voltage of the external power source received and electrically energizing the microprocessor by the buck auxiliary circuit; activating power elements in the DC/DC converter for a certain time period by the microprocessor and then activating power elements in the AC/DC converter by the microprocessor; and modulating a voltage of the external power source by the AC/DC converter so that an output voltage is generated by the DC/DC converter accordingly.

As such, the instant disclosure provides the driving electric power to each main component (such as the microprocessor) by means of the buck auxiliary circuit so that each main component can be activated on. The buck auxiliary circuit is electrically coupled to the external power source. It means that once the external power source is connected, the buck auxiliary circuit will automatically reduce a voltage and supply electric power, allowing the module to automatically start to operate. It realizes that the module will autonomously operate after being electrically powered, without the need of additional circuits for supplying electric power or for control.

In addition, the instant disclosure sets that the power elements in the downstream side DC/DC converter are activated first, and then the power element in the upstream side AC/DC converter is activated, thereby effectively suppressing an inrush current and avoiding damage of electronic elements at the primary side line of a transformer caused by the impact of the inrush current. Moreover, the modular AC/DC power conversion module for power sources and loads of the instant disclosure shares the same microprocessor. In addition to reducing costs, the overall operation can be smoother and more efficient.

The modular AC/DC power conversion module for power sources and loads and the method of driving the same according to the instant disclosure adopt a digital control manner so the protection value can be easily adjusted according to the requirements of different output stages. The modular AC/DC power conversion module for power sources and loads of the instant disclosure has an abnormality reporting and protection mechanism. When abnormality occurs, the output power conversion module at the downstream side will be notified of abnormality and stop operation, thereby avoiding a chain reaction and thus an irreparable consequence.

DESCRIPTION OF THE PREFERRED EMBODIMENTS

Before a modular AC/DC power conversion module for power source and loads and a method of driving the same according to the instant disclosure are described in detail in embodiments, it should be noted that in the following description, similar components will be designated by the same reference numerals. Furthermore, the drawings of the instant disclosure are for illustrative purposes only, they are not necessarily drawn to scale, and not all details are necessarily shown in the drawings.

Figure 1:
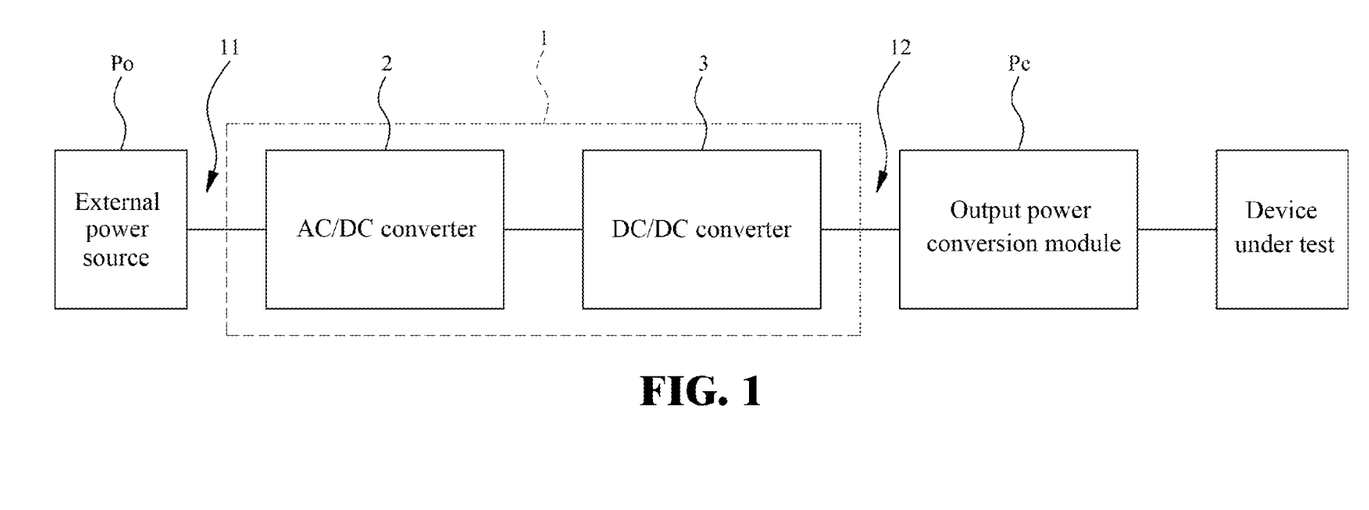
FIG. 1 is a block diagram of a usage situation of a preferred embodiment of the instant disclosure.

Reference is made to FIG. 1, which is a block diagram of a usage situation of a preferred embodiment of the instant disclosure. As shown in the figure, a first end 11 of an AC/DC power conversion module 1 of this embodiment is coupled to an external power source Po, that is, it can be connected in parallel with the mains, and a second end 12 of the AC/DC power conversion module 1 can be arbitrarily provided with an output power conversion module Pc having a DC current input so that the combination of the AC/DC power conversion module 1 and the output power conversion module Pc can form, for example, a power supply module or an electronic load module. That is to say, this embodiment completely realizes modularization, allowing various types of bidirectional power apparatuses to share the advantages and achievements brought by modularization.

Figure 2:
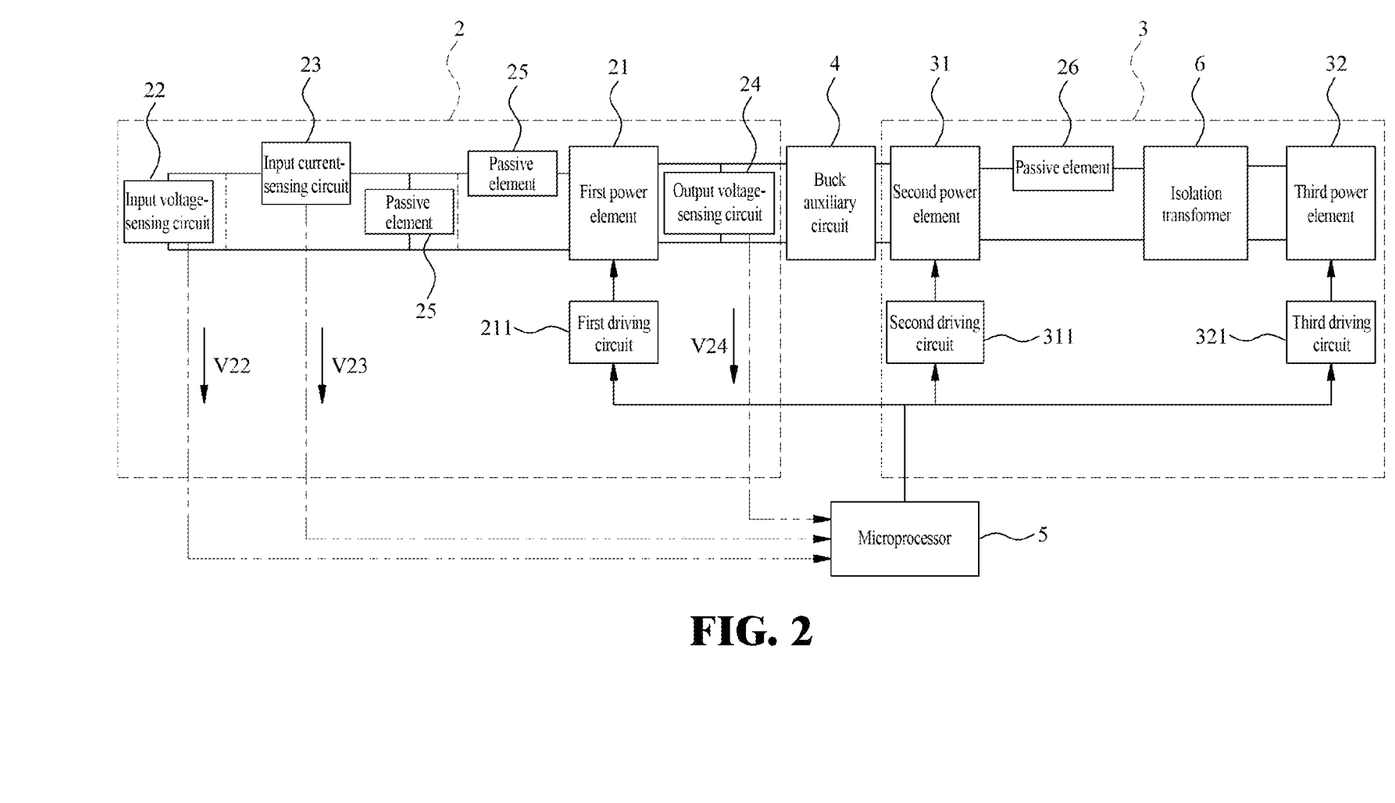
FIG. 2 is a system architecture diagram of a preferred embodiment of the instant disclosure.

Reference is made to FIG. 2, which is a system architecture diagram of a preferred embodiment of the instant disclosure. As shown in the figure, the AC/DC power conversion module 1 of this embodiment mainly includes an AC/DC converter 2, a DC/DC converter 3, a buck auxiliary circuit 4 and a microprocessor 5. The AC/DC converter 2 of this embodiment mainly includes a first power element 21, a first driving circuit 211, an input voltage-sensing circuit 22, an input current-sensing circuit 23, an output voltage-sensing circuit 24 and a plurality of passive elements 25.

The first power element 21 of this embodiment capable of effectively reducing the switching loss is formed with an insulated gate bipolar transistor (IGBT) and a silicon carbide (SIC) power switch connected in parallel. One end of the first driving circuit 211 is electrically connected to the first power element 21, and the other end is electrically connected to the microprocessor 5 so that the first driving circuit 211 can be driven by the microprocessor 5 to control the operation of the first power element 21.

The input voltage-sensing circuit 22 and the input current-sensing circuit 23 in this embodiment are mainly used to detect the input voltage value V22 and the input current value V23 of the external power source Po respectively and to report them to the microprocessor 5. The passive elements 25 in the AC/DC converter 2 include electronic elements such as inductors, capacitors and resistors. The output voltage-sensing circuit 24 is mainly used to detect the output voltage of the AC/DC converter 2, that is, to detect the voltage of a DC bus (not shown in the figure). The AC/DC converter 2 of this embodiment also has a power factor correction (PFC) circuit so that the power source terminal can transmit energy to downstream modules most efficiently.

The DC/DC converter 3 of this embodiment mainly includes a second power element 31, a third power element 32, a second driving circuit 311, a third driving circuit 321, an isolation transformer 6 and a passive element 26. Each of the second power element 31 and the third power element 32 is a silicon carbide semiconductor power element. One ends of the second driving circuit 311 and the third driving circuit 321 are electrically connected to the second power element 31 and the third power element 32 respectively, and the other ends of the second driving circuit 311 and the third driving circuit 321 are electrically connected to the microprocessor 5.

Consequently, the second driving circuit 311 and the third driving circuit 321 can be driven by the microprocessor 5 to control the operations of the second power element 31 and the third power element 32 respectively. The passive element 26 of this embodiment is a resonator for transferring energy from a primary side to a secondary side. Overall, the DC/DC converter 3 of this embodiment is a bidirectional LLC resonant DC power converter with isolated buck-boost technology.

On the other hand, the buck auxiliary circuit 4 is electrically coupled between the AC/DC converter 2 and the DC/DC converter 3 and electrically coupled to the microprocessor 5, the input voltage-sensing circuit 22, the input current-sensing circuit 23, the first driving circuit 211, the second driving circuit 311 and the third driving circuit 321. Substantially, the buck auxiliary circuit 4 of this embodiment has the characteristic of high buck conversion ratio and is capable of directly converting the input voltage of the external power source Po into the working voltages, such as 12V or 5V, for the microprocessor 5, the driving circuits and the sensing circuits and then electrically energizing these components.

Figure 3:
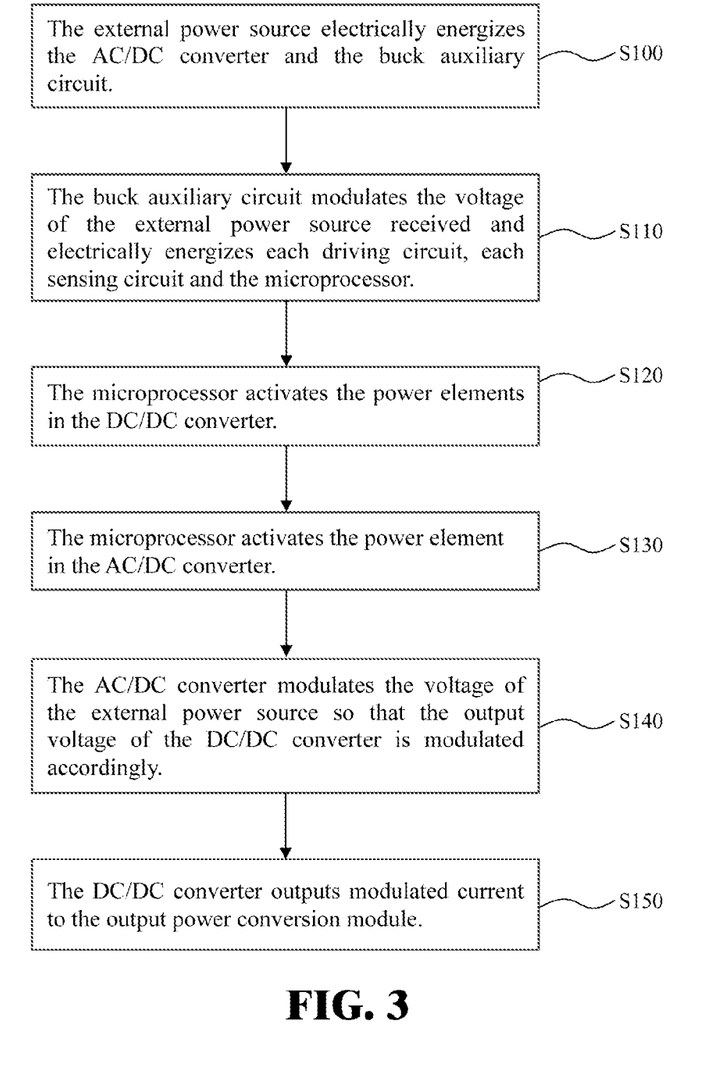
FIG. 3 is a flowchart of a driving method according to a first embodiment of the instant disclosure.

Reference is made to FIG. 3, which is a flow chart of a driving method according to a first embodiment of the instant disclosure. The method of driving the AC/DC power conversion module 1 of this embodiment is described below. First, in the step S100 of FIG. 3, the AC/DC power conversion module 1 is electrically coupled to the external power source Po, that is, the external power source Po electrically energizes the AC/DC converter 2 and the buck auxiliary circuit 4. At this time, the buck auxiliary circuit 4 modulates a voltage of the external power source Po received and electrically energizes the microprocessor 5, the second driving circuit 311, the third driving circuit 321, the input voltage-sensing circuit 22, the input current-sensing circuit 23 and the output voltage-sensing circuit 24, as shown in the step S110 of FIG. 3.

When the microprocessor 5 and the related sensing circuits are electrically energized, the microprocessor 5 outputs a control signal to the second driving circuit 311 and the third driving circuit 321 so as to activate the second power element 31 and the third power element 32, as shown in the step S120 of FIG. 3. That is to say, before the AC/DC converter 2 supplies electric power to the DC/DC converter 3, the DC/DC converter 3 is activated. The purpose of this approach is to suppress an inrush current. If the AC/DC converter 2 directly supplies electric power to the DC/DC converter 3 before the second power element 31 and the third power element 32 of the DC/DC converter 3 are activated, a spike of current generated when electric power is supplied may directly impact electronic elements in circuits, especially the circuit on the primary side of the transformer. At least, it will affect the service life of electronic elements, and at worst, it will cause failure or burnout of the circuits.

After the step S120 of this embodiment, that is, after the second power element 31 and the third power element 32 are activated under control of the microprocessor 5, the system will maintain this activation for a certain time period, about tens of milliseconds, to ensure that the step S130 is performed, that is, the microprocessor 5 outputs a power control signal to the first driving circuit 211 to control the operation of the first power element 21, only after the DC/DC converter 3 has been completely activated. The way to generate the power control signal will be described in detail below.

Figure 4:
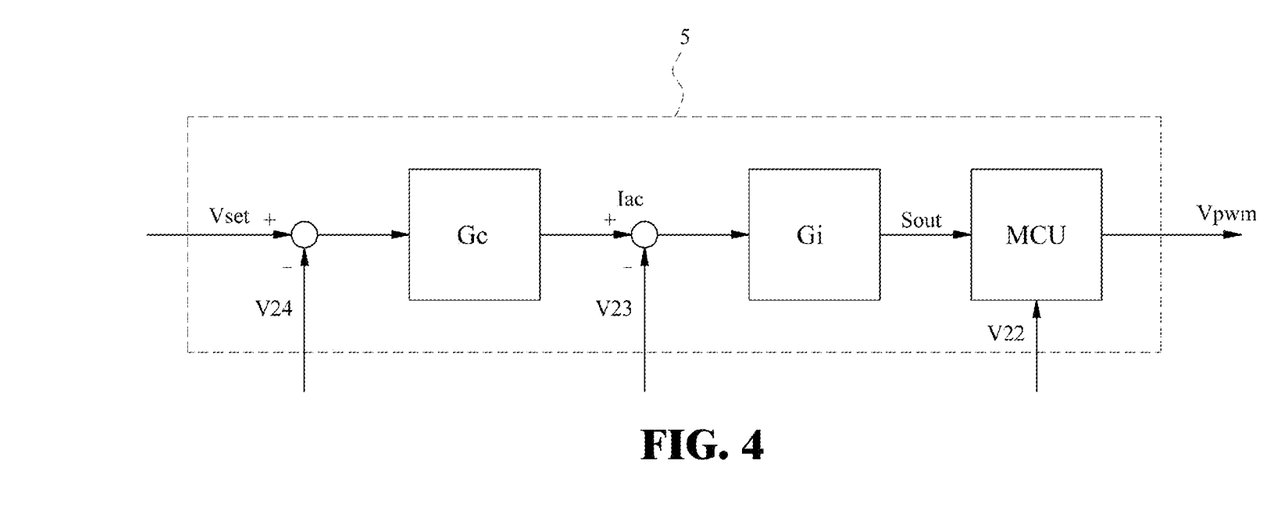
FIG. 4 is a schematic diagram showing that a microprocessor according to a preferred embodiment of the instant disclosure generates a power control signal.

Reference is made to FIG. 4, which is a schematic diagram showing that the microprocessor according to a preferred embodiment of the instant disclosure generates the power control signal. The microprocessor 5 of this embodiment mainly includes a voltage compensator Gc, a current compensator Gi and a computing unit MCU, wherein the voltage compensator Gc generates a current control command Iac according to a predetermined voltage value Vset and an output voltage value V24 detected by the output voltage-sensing circuit 24. Specifically, the predetermined voltage value Vset is a voltage value set by the user through a human-machine interface and a DC bus (not shown in the figure), and the predetermined voltage value Vset is compared with the output voltage value V24 (for example, addition or subtraction) and then the compared result is inputted to the voltage compensator Gc, and the voltage compensator Gc compensates the voltage through function operation and steady-state error compensation and then generates the current control command Iac, which is a voltage type AC control signal.

Next, the current control command Iac is compared with the input current value V23 detected by the input current-sensing circuit 23 (for example, addition or subtraction), and the compared current value is inputted to the current compensator Gi. The current compensator Gi compensates the current through function operation and steady-state error compensation and then generates an output control command Sout. The computing unit MCU obtains the voltage phase of the input voltage through phase-locked loop operation on the input voltage value V22 detected by the input voltage-sensing circuit 22, and the computing unit MCU generates a power control signal Vpwm through operation according to the aforementioned output control command Sout and the phase of the input voltage. In other words, the computing unit MCU calculates the conduction amount of the first power element 21, that is, the duty ratio of the semiconductor switching element, according to the aforementioned output control command Sout and the phase of the input voltage and outputs the PWM (Pulse Width Modulation) type power control signal Vpwm to the first driving circuit 211, thereby driving the first power element 21 to operate.

Reference is made to FIG. 3 again. When the power element in the AC/DC converter 2 is activated, the AC/DC converter 2 can immediately modulate (usually boost) the voltage of the external power source Po. On the other hand, because the AC/DC power conversion module 1 of this embodiment adopts an open-loop design, once the voltage of the power source supplied to the AC/DC converter 2 is boosted, the voltage in the DC/DC converter 3 will be modulated and boosted accordingly, as shown in the step S140 of FIG. 3. Finally, the DC/DC converter 3 outputs the modulated current to the output power conversion module Pc for the subsequent power supply or electronic load, as shown in step S150 of FIG. 3.

It can be seen from this that the modular AC/DC power conversion module for power sources and loads and the method of driving the same in this embodiment at least have the following advantages:

(1) This embodiment realizes the modularization of AC/DC power conversion, which can be used as a power converter connected in parallel with the mains, and at the downstream side of which the output power conversion module Pc having a DC current input, such as a power supply module or an electronic load module, can be arbitrarily arranged so that various types of bidirectional power source or load apparatuses can share the achievements of modularization.

(2) The AC/DC power conversion module 1 of this embodiment meets all requirements of various power apparatuses for the AC/DC power conversion module, including universal input, overall efficiency, power isolation, etc. and adopts an active power factor correction and bidirectional LLC resonant power module (i.e. PFC+LLC Resonant Power module).

(3) The AC/DC power conversion module 1 of this embodiment uses a digital signal processor as the microprocessor 5, which can easily adjust the protection value according to the needs of different output stages by means of a digital signal control manner. The AC/DC converter 2 and the DC/DC converter 3 share the microprocessor 5 so that the cost is reduced, the overall operation can be smoother and more efficient.

(4) The power element in the AC/DC converter 2 of this embodiment is formed with an insulated gate bipolar transistor (IGBT) and a silicon carbide (SIC) power switch which are connected in parallel and can effectively reduce the switching loss. Also, the silicon carbide elements can be used in the DC/DC converter 3 as main switching elements, which can further improve efficiency of the module.

(5) The DC/DC converter 3 of this embodiment is a bidirectional LLC resonant DC power converter with isolated buck-boost technology, in which the number of turns can be adjusted to meet the requirements of outputting high and low voltages.

(6) The AC/DC power conversion module 1 of this embodiment realizes "single power input, autonomous activation", in which the microprocessor, the sensing circuits and the power element-driving circuits are first electrically energized by the buck auxiliary circuit 4 so that the main components can be activated first. That is to say, after the external power source Po is powered, the buck auxiliary circuit 4 will automatically reduce the voltage of the power input and supply the same, so that the module starts to operate automatically.

It realizes that the module will autonomously operate after being electrically powered, without the need for additional auxiliary circuits for the power supply or control. Also, after the voltage is established, the output power converter Pc can be automatically activated and start to operate.

(7) The buck auxiliary circuit 4 of the present embodiment is electrically coupled between the AC/DC converter 2 and the DC/DC converter 3. This arrangement not only reduces the volume but also greatly reduces the complexity of circuits and improves efficiency and service life.

(8) The AC/DC power conversion module 1 of this embodiment has an abnormality reporting and protection mechanism. When an abnormality occurs, the output power conversion module Pc at the downstream side will be automatically notified of the abnormality and stops operation, thereby avoiding a chain reaction and thus an irreparable consequence.

The preferred embodiments of the instant disclosure are illustrative only, and the claimed inventions are not limited to the details disclosed in the drawings and the specification. Accordingly, it is intended that it have the full scope permitted by the language of the following claims.

What is claimed is:

1. A modular AC/DC power conversion module for power sources and loads, comprising:
    an AC/DC converter, including a first power element, the first power element being electrically coupled to an external power source;
    a DC/DC converter, including a second power element and a third power element, the second power element and the third power element being electrically coupled to each other, the second power element being electrically coupled to the AC/DC converter, and the third power element being electrically coupled to an output power conversion module;
    a buck auxiliary circuit, electrically coupled between the AC/DC converter and the DC/DC converter; and
    a microprocessor, electrically coupled to the AC/DC converter, the DC/DC converter and the buck auxiliary circuit,
    wherein when the AC/DC converter is electrically coupled to the external power source, the microprocessor is electrically powered by the buck auxiliary circuit; under control of the microprocessor, the second power element and the third power element are activated for a certain time period, and then, the first power element is activated; an output voltage of the AC/DC converter is boosted, and an output voltage of the DC/DC converter is boosted accordingly;
    wherein the AC/DC converter further includes a first driving circuit, an input voltage-sensing circuit and an input current-sensing circuit; the first driving circuit is electrically coupled to the first power element, the microprocessor and the buck auxiliary circuit; the input voltage-sensing circuit and the input current-sensing circuit are electrically coupled to the microprocessor and the buck auxiliary circuit, wherein when the AC/DC converter is electrically coupled to the external power source, the first driving circuit, the input voltage-sensing circuit and the input current-sensing circuit are electrically energized by the buck auxiliary circuit; the input voltage-sensing circuit and the input current-sensing circuit respectively provide an input voltage value and an input current value to the microprocessor.

2. The modular AC/DC power conversion module for power sources and loads of claim 1, wherein the DC/DC converter further includes a second driving circuit and a third driving circuit; the second driving circuit is electrically coupled to the second power element, the microprocessor and the buck auxiliary circuit, and the third driving circuit is electrically coupled to the third power element, the microprocessor and the buck auxiliary circuit; when the AC/DC converter is electrically coupled to the external power source, the second driving circuit and the third driving circuit are electrically energized by the buck auxiliary circuit.

3. The modular AC/DC power conversion module for power sources and loads of claim 1, wherein the AC/DC converter further includes an output voltage-sensing circuit, which is electrically coupled between the first power element and the DC/DC converter and electrically coupled to the microprocessor and the buck auxiliary circuit; the output voltage-sensing circuit provides an output voltage value to the microprocessor.

4. The modular AC/DC power conversion module for power sources and loads of claim 3, wherein the microprocessor includes a voltage compensator, a current compensator and an computing unit; the voltage compensator generates a current control command according to a predetermined voltage value and the output voltage value; the current compensator generates an output control command according to the current control command and the input current value; the computing unit processes the input voltage value to obtain an input voltage phase, generates a power control signal according to the output control command and the input voltage phase and outputs the power control signal to the first driving circuit.

5. The modular AC/DC power conversion module for power sources and loads of claim 1, wherein the DC/DC converter further includes an isolation transformer, which is electrically coupled between the second power element and the third power element.

6. The modular AC/DC power conversion module for power sources and loads of claim 5, wherein the DC/DC converter further includes a resonator, which is electrically coupled between the second power element and the isolation transformer.

7. A method of driving a modular AC/DC power conversion module for power sources and loads, wherein the modular AC/DC power conversion module for power sources and loads includes an AC/DC converter, a DC/DC converter, a buck auxiliary circuit and a microprocessor; the buck auxiliary circuit is electrically coupled between the AC/DC converter and the DC/DC converter; the microprocessor is electrically coupled to the AC/DC converter, the DC/DC converter and the buck auxiliary circuit, the method comprising the steps of:
- (A) providing an external power source to the AC/DC converter and the buck auxiliary circuit;
- (B) modulating a voltage of the external power source received and supplying electric power to the microprocessor by the buck auxiliary circuit;
- (C) activating at least one power element in the DC/DC converter for a certain time period by the microprocessor;
- (D) activating at least one power element in the AC/DC converter by the microprocessor; and
- (E) modulating a voltage of the external power source by the AC/DC converter so that an output voltage is generated by the DC/DC converter accordingly;

wherein the AC/DC converter further includes a first driving circuit, an input voltage-sensing circuit and an input current-sensing circuit; the DC/DC converter further includes a second driving circuit, a third driving circuit and an output voltage-sensing circuit; the first driving circuit, the second driving circuit, the third driving circuit, the input voltage-sensing circuit, the input current-sensing circuit and the output voltage-sensing circuit are electrically coupled to the microcomputer and the buck auxiliary circuit; the first driving circuit is used for driving the power element in the AC/DC converter; the second driving circuit and the third driving circuit are used for driving the power elements in the DC/DC converter; in the step (B), the first driving circuit, the second driving circuit, the third driving circuit, the input voltage-sensing circuit, the input current-sensing circuit and the output voltage-sensing circuit are electrically energized by the buck auxiliary circuit.

8. The method of claim 7, wherein the microprocessor includes a voltage compensator, a current compensator and a computing unit; in the step (D), the microprocessor outputs a power control signal to the first driving circuit to activate the power element in the AC/DC converter; the power control signal is generated by:
- generating a current control command by the voltage compensator according to a predetermined voltage value and an output voltage value detected by the output voltage-sensing circuit;
- generating an output control command by the current compensator according to the current control command and an input current value detected by the input current-sensing circuit; and
- processing an input voltage value detected by the input voltage-sensing circuit by the computing unit to obtain an input voltage phase and generating the power control signal according to the output control command and the input voltage phase.

* * * * *